United States Patent [19]

Hover

[11] 4,249,502
[45] Feb. 10, 1981

[54] METHOD AND APPARATUS FOR GENERATING AND DELIVERING GASEOUS FUEL VAPOR TO AN INTERNAL COMBUSTION ENGINE

[76] Inventor: David J. Hover, 1316 Kent Dr., Brunswick, Ohio 44212

[21] Appl. No.: 45,187

[22] Filed: Jun. 4, 1979

[51] Int. Cl.³ ............................................. F02M 31/00
[52] U.S. Cl. ...................................... 123/557; 123/558
[58] Field of Search ................... 123/133, 122 E, 134; 261/144, 145, ; 48/180 R; 137/411, 445

[56] References Cited

U.S. PATENT DOCUMENTS

| | | | |
|---|---|---|---|
| 353,311 | 11/1886 | Keller | 137/411 |
| 1,629,898 | 5/1927 | Williams | 123/134 |
| 2,261,234 | 11/1941 | Delancey | 137/445 |
| 2,285,905 | 6/1942 | Cunningham | 123/133 |
| 3,713,429 | 1/1973 | Dwyre | 123/134 |
| 3,783,841 | 1/1974 | Hirschler | 123/122 E |
| 3,794,000 | 2/1974 | Hodgkinson | 123/122 E |
| 3,807,377 | 4/1974 | Hirschler | 123/122 E |
| 4,050,419 | 9/1977 | Harpman | 123/133 |
| 4,146,002 | 3/1979 | Quinn | 123/133 |

FOREIGN PATENT DOCUMENTS 792959 11/1935 France ...................................... 137/411

*Primary Examiner*—Ronald H. Lazarus
*Attorney, Agent, or Firm*—Meyer, Tilberry & Body

[57] ABSTRACT

A hermetically sealed housing provides an enclosure for low and high pressure gaseous fuel vapor chambers and for a liquid fuel receiving reservoir which receives liquid fuel such as gas from the fuel tank of a vehicle. The reservoir has a vapor space above the liquid fuel therein, and a pair of vacuum operated pumps serve to pump vapor from the vapor space sequentially to the low and high pressure chambers. Check valves are provided to prevent backflow of gaseous vapor toward the vapor space, and the high pressure chamber is provided with an outlet connectable to the air induction passage of an internal combustion engine for delivering gaseous vapor thereto. The outlet from the high pressure chamber is connected to the air induction passage through a pressure regulator valve and throttle valves which are closed when the engine is shut down so that vapor is maintained in the second chamber at the high pressure thereof when the engine is stopped. The liquid fuel reservoir includes a unique dual needle valve arrangement to provide positive shutoff of liquid fuel flow into the reservoir and to minimize turbulance of liquid fuel flow into the reservoir.

15 Claims, 2 Drawing Figures

METHOD AND APPARATUS FOR GENERATING AND DELIVERING GASEOUS FUEL VAPOR TO AN INTERNAL COMBUSTION ENGINE

BACKGROUND OF THE INVENTION

The present invention relates to the art of internal combustion engines and, more particularly, to a method and apparatus for generating and delivering gaseous fuel vapor to the air induction passage of an internal combustion engine.

Many efforts have been made heretofore to provide apparatus and systems for generating gaseous vapor from a liquid fuel such as gasoline and operating an internal combustion engine with such gaseous vapor. The greatest advantage of a gaseous vapor operating engine would of course be fuel economy which is becoming progressively more important in light of present day petroleum fuel shortages. Generally, gaseous fuel vapor generating systems include a source of liquid fuel such as gasoline which is heated to produce gaseous vapor which is then delivered to the air induction passage of an internal combustion engine for mixture with air and combustion of the mixture in the cylinders of the engine to achieve operation thereof.

To the best of my knowledge, the systems and apparatus heretofore provided have not been commercially acceptable for a number of reasons including safety, reliability and/or efficiency of operation, and the size and/or complexity and production costs. More particularly in this respect, certain systems heretofore devised have been dual systems relying on liquid fuel for starting an engine and gaseous vapor for operating the engine after starting. Such a system is structurally complex and expensive to produce because of the dual nature thereof and, additionally, is less economical and efficient than desired because of the use of liquid fuel. Moreover, any burning of liquid fuel is undesirable from the standpoint of pollution. Systems have also been devised to operate internal combustion engines using gaseous vapor alone, but these systems require a waiting period during which sufficient fuel vapor is generated to start and operate the engine. Such initial vapor generation requires a source of heat separate from the internal combustion engine for heating the liquid gasoline, such a source being an electrical resistance heater for example from the vehicle battery. Accordingly, in addition to the time delay in connection with starting the engine, there is a danger associated with the use of such external heating means. Moreover, systems relying on exhaust line temperatures of the engine for heating the liquid fuel after the engine is started are likewise dangerous because of the spark content in exhaust gases. Still further, the systems heretofore provided have included electrically operated control valves, pumps and the like, again creating potential hazards with respect to spark ignition of the highly volatile fuel vapor. Furthermore, such component parts and the electrical circuitry therefore are expensive and the component parts do not lend to a compact unitary arrangement thereof but, rather, require excessive space for installation as well as physical separation from one another in mounting.

SUMMARY OF THE INVENTION

The foregoing and other disadvantages of methods and apparatus heretofore provided for generating and delivering gaseous fuel vapor to an internal combustion engine are overcome or minimized in accordance with the present invention. More particularly, the present invention provides a method and apparatus for generating gaseous fuel vapor from a liquid fuel and storing the vapor under pressure during periods of non-use of the internal combustion engine, whereby immediate start up of the engine is achieved without a time delay or the use of liquid fuel. Moreover, the apparatus according to the present invention enables the use of vacuum operated components such as pumps and valves, whereby both the danger and expense of electrical components and circuitry therefor is avoided. Advantageously, no electrically operated parts or controls are necessary in the system at all. Still further, the apparatus according to the present invention enables the construction of a compact, unitary gaseous vapor generating system which is inexpensive to manufacture, is light weight, and has minimum space requirements with regard to association thereof with an internal combustion engine, such as under the hood of an automotive vehicle. The apparatus further provides safety features which shut the system down in the event of a malfunction in the engine.

In accordance with one aspect of the invention, gaseous fuel vapor is pumped into a low pressure chamber and thence to a second higher pressure chamber, and backflow of vapor from the high pressure chamber to the low pressure chamber and from the latter to the source of gaseous vapor is prevented. Additionally, the high pressure chamber has an outlet for delivering gaseous vapor under pressure to the air induction passage of the engine, and flow of vapor to the engine is adapted to be stopped with shut down of the engine, whereby gaseous fuel vapor is maintained in the high pressure chamber during periods of non-use of the engine. The stored vapor is available from the high pressure chamber for starting engine and operating the engine for several minutes, thus providing sufficient time for warm up and heating of liquid fuel to generate gaseous vapor to recharge the system. The sequential pumping of fuel vapor in the foregoing manner advantageously allows the gradual build up of pressure without the excessive heat which would be generated from a direct build up. Additionally, the low pressure chamber provides a reserve source of vapor for delivery to the high pressure chamber during start and warm up of the engine. The prevention of backflow of gas from the pressure chambers of course enables maintaining gas vapor therein at the desired pressures, and the prevention of backflow from the low pressure chamber to the fuel vapor source advantageously avoids creating an undesirable pressure in the liquid fuel reservoir. Still further, the apparatus of the present invention advantageously enables throttle controlled delivery of gas vapor for normal operation of the internal combustion engine, and an acceleration responsive control provides momentary increase of the fuel vapor feed pressure when sudden acceleration of the engine is demanded.

In accordance with a preferred embodiment of the invention, the pumping of gas vapor is achieved by vacuum operated compressor pumps. Thus, any malfunction rendering the vacuum system of the engine inoperative advantageously causes all functions of the system to cease. After the system is first charged, there is no oxygen present anywhere in the fuel vapor chambers, whereby there can be no combustion until the gaseous fuel vapor is introduced into the engine. The reduction in unburned blow-by gases and more complete combustion in the engine result in improved efficiency and improved mileage per liquid gallon fuel, whereby the main fuel tank for the vehicle may be reduced in size, thereby reducing explosion and fire hazards and increasing cargo capacity of the vehicle. Still further, such a gaseous vapor fuel supply system enables the air induction device and intake manifolds and the exhaust manifold to be made of sheet metal or tubing as opposed to iron or aluminum castings, thus reducing weight and manufacturing costs with respect to the engine as well as heat retention in the engine compartment. By reducing the engine compartment temperature, engine heat is more rapidly dissipated, thus enabling a reduction in water jacket and cooling system size and thus a further reduction in weight and overall engine size.

In accordance with another aspect of the invention, gaseous fuel vapor is generated in a liquid fuel reservoir which receives liquid fuel such as gasoline through an inlet passage controlled by a unique float operated dual needle valve arrangement. The latter includes serially arranged relatively displaceable needle valves and corresponding seats, one of the valves being positively actuated by a float in the reservoir to close flow thereinto. The other needle valve is supported by the one and is responsive to displacement of the one valve and to liquid fuel under pressure being pumped to the reservoir from a storage tank by a fuel pump. The dual arrangement advantageously provides positive control of the liquid level in the reservoir, even in response to over pressure from the rated pressure of the fuel pump, and controls flow of liquid fuel into the reservoir to minimize turbulence and spattering thereof.

It is accordingly an outstanding object of the present invention to provide improved apparatus for generating gaseous fuel vapor from liquid fuel for delivery to the air induction passage of an internal combustion engine for operating the engine.

Another object is the provision of apparatus of the foregoing character which enables immediate start up and continued operation of an internal combustion engine using only gaseous fuel vapor.

Yet another object is the provision of apparatus of the foregoing character which provides for storage of gaseous fuel vapor under pressure during periods of non-use of an internal combustion engine.

A further object is the provision of apparatus of the foregoing character which provides for sequential pumping of gaseous fuel to serially and sequentially arranged low and high pressure storage chambers.

Still a further object is the provision of apparatus of the foregoing character which is comprised of a minimum number of moving parts and wherein the component parts are compactly organized to minimize space requirements for the apparatus.

Still another object is the provision of apparatus of the foregoing character which is extremely safe for use in that it requires no electrical circuitry or electrically operated components and is rendered inoperable in the event of a malfunction in the engine.

Still another object is the provision of apparatus of the foregoing character which includes a reservoir for liquid fuel and a unique flow controlled needle valve arrangement providing both positive shutoff of liquid flow to the reservoir and control of liquid flow to the reservoir to minimize spattering and turbulent flow of liquid fuel into the reservoir.

Another object of the present invention is the provision of an improved method of generating gaseous fuel vapor from a liquid fuel and pressurizing, storing and delivering gaseous fuel vapor to an internal combustion engine for operation thereof.

BRIEF DESCRIPTION OF THE DRAWING

The foregoing objects, and others, will in part be obvious and in part pointed out more fully hereinafter in conjunction with the written description of a preferred embodiment of the invention illustrated in the accompanying drawings in which.

DESCRIPTION OF THE PREFERRED EMBODIMENT

Figure 1:
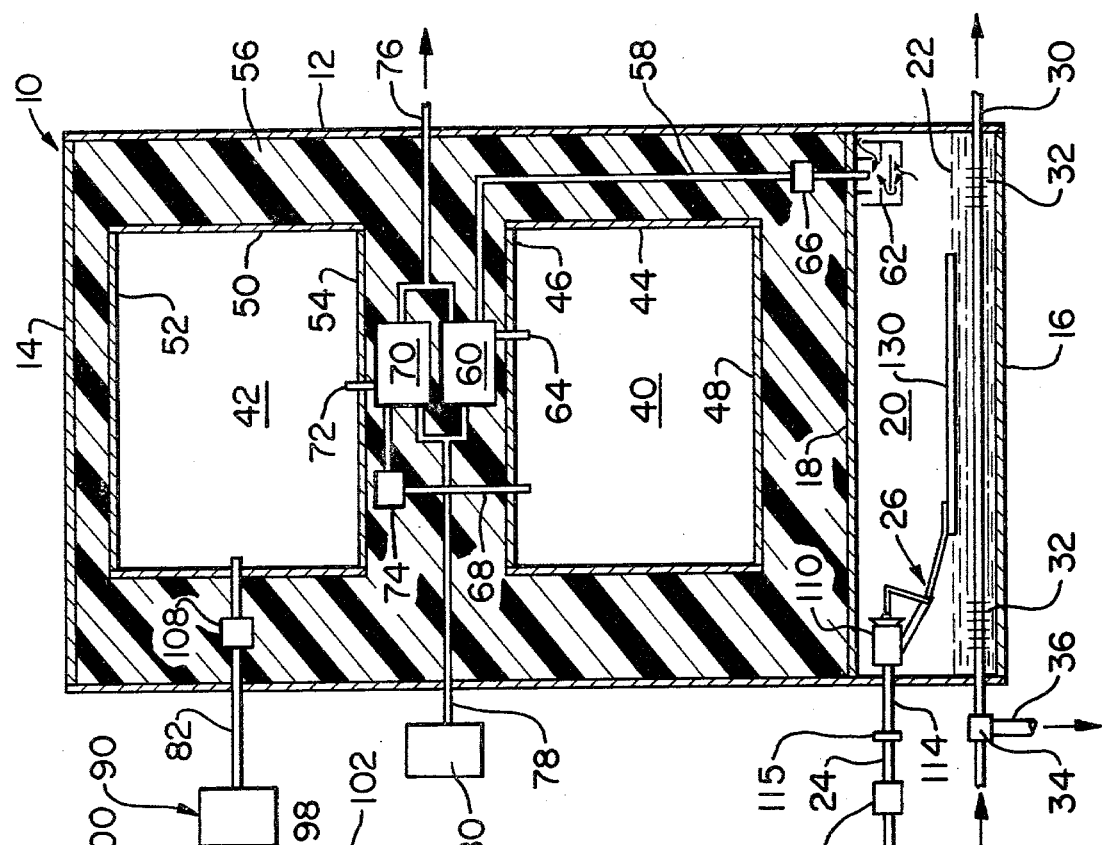
FIG. 1 is a diagrammatic view, partially in section, of apparatus for generating, storing and delivering gaseous fuel vapor to an internal combustion engine; and, FIG. 2 is an enlarged sectional elevation view of the needle valve assembly for the liquid fuel reservoir of the apparatus shown in FIG. 1.

Referring now in greater detail to the drawing wherein the showings are for the purpose of illustrating a preferred embodiment of the invention only and not for the purpose of limiting the invention, the gaseous vapor generating and storing apparatus includes a canister or housing 10 comprising a cylindrical side wall 12, a top end wall 14, a bottom end wall 16, and a partition wall 18 spaced inwardly a short distance from wall 16. Walls 14, 16 and 18 are each hermetically sealed with respect to side wall 12, such as by welding. Walls 16 and 18 together with the corresponding portion of side wall 12 define a liquid fuel reservoir 20. Reservoir 20 is adapted to contain a small amount of liquid fuel 22, preferably about 4–8 fluid ounces, and provides a vapor space between liquid fuel 22 and wall 18. Liquid fuel such as gasoline is adapted to be pumped to reservoir 20 through a fuel line 24 by a fuel pump and from the vehicle gas tank, not shown. Generally, such fuel pumps operate to pump fuel at a pressure of about 4–7 psi. Liquid fuel is metered into chamber 20 through a flow control needle valve assembly 26, described more fully hereinafter, and a check valve 28 is provided in fuel line 24 to prevent backflow of fuel under pressure toward the fuel pump and fuel tank in the event of a breakdown in the float assembly 26 which would result in flooding chamber 20.

A heat transfer line or tube 30 extends through reservoir 20 adjacent wall 16 and has its opposite ends connected to a source of heated liquid for circulation of the latter through chamber 20 to heat liquid fuel 22 therein. Preferably, line 30 is provided with metal fins 32 along the length thereof in chamber 20 to promote heat transfer to the liquid fuel, and the opposite ends of line 30 can be connected to any suitable source of liquid adapted to be heated in response to engine operation, such as the water circulating system, the oil circulating system, or the high side of a refrigeration system if such is available with a given automotive vehicle. If so, the latter arrangement is preferred in that the response time for realizing available heat upon engine start up is less using the high side of the refrigeration system than it is either with the water or oil circulating systems. While liquid flow for heat transfer purposes is preferred, for safety purposes, it will be appreciated that liquid fuel in reservoir 20 could also be heated by passing the exhaust line of the engine or a bypass of the exhaust line through or adjacent reservoir 20. Preferably, a temperature of about 180°–195° F. is maintained for heating liquid fuel 22 and, for this purpose, flow line 30 is provided with a temperature responsive thermostat 34 to control the flow of heat transfer liquid through line 30 in fuel reservoir 20. It will be appreciated in this respect that the thermostat is operable when the predetermined temperature is reached to bypass the flow of heat transfer fluid through a line 36 leading back to the fluid source.

Walls 14 and 18 of housing 10 together with the corresponding portion of side wall 12 therebetween provide a hermetrically sealed enclosure for first and second gaseous fuel vapor chambers 40 and 42, respectively. Chamber 40 is defined by a cylindrical side wall 44 and top and bottom end walls 46 and 48, respectively, which are hermetrically sealed to wall 44 such as by welding. Similarly, chamber 42 is defined by a cylindrical side wall 50 and upper and lower end walls 52 and 54 hermetically sealed to side wall 50 such as by welding. Chambers 40 and 42 preferably have a volume of about 1 ft.$^3$, or less, and preferably are supported in housing 10 in spaced apart relationship with respect to one another and with housing walls 12, 14 and 18 by a suitable foamed plastic material 56. Any suitable rigid foamed plastic material can be used, such as polyurethane for example. Preferably, the foamed plastic has a thermal insulating factor of R9 or greater to provide temperature isolation for the pressurized vapor chambers.

Chambers 40 and 42 are respectively low and high pressure gaseous vapor chambers connected in series with one another from the gas vapor source as defined by the vapor space above liquid fuel 22 and reservoir 20. More particularly in this respect, low pressure chamber 40 is connected to the source of gaseous fuel vapor by means of a flow line 58 and a first vacuum operated compression pump 60. Line 58 has an inlet end disposed in the vapor space above liquid fuel 22 and reservoir 20, and the other end of line 58 is connected to the inlet side of pump 60. Preferably, a baffle arrangement 62 is provided in reservoir 20 to assure that only gas vapor enters line 58. The outlet 64 of pump 60 opens into chamber 40, and the compression pump preferably has a capability of delivering gaseous fuel vapor to chamber 40 at a pressure of from about 12–15 psi. Further, line 58 is provided with a check valve 66 to prevent the backflow of low pressure gas from chamber 40 to reservoir 20. Low pressure chamber 40 communicates with high pressure chamber 42 through a flow line 68 and a second vacuum operated compression pump 70 having an outlet 72 opening into chamber 42. Pump 70 preferably has a capability of delivering gaseous fuel vapor to chamber 42 at a pressure of from about 70–80 psi, and line 68 is provided with a check valve 74 to prevent the backflow of high pressure gas from chamber 42 to chamber 40. Vacuum operated pumps 60 and 70 are connected to a vacuum source of the internal combustion engine with which the apparatus is associated by means of a common vacuum line 76, and an air inlet line 78 provides fresh air through a suitable air filter 80 to assure proper operation of the vacuum pumps. Advantageously, chambers 40 and 42 and compression pumps 60 and 70 can readily be produced by minor modifications of air cylinder and air compression pump units used in the automotive industry in connection with the automatic level control type shock absorbing systems for automobiles. The compression pumps of such units are provided with regulators enabling control of the pressurizing capacity thereof. Moreover, they are operable at a vacuum of about 15" Hg or greater.

High pressure chamber 42 is adapted to be connected to the air induction device of the internal combustion engine through a flow line having appropriate flow control devices therein for regulating the flow of gaseous vapor to the engine. More particularly in this respect, high pressure chamber 42 is connected to a flow line 82 leading to air induction device 84 of an internal combustion engine 86 and opening into air induction passage 88 of the air induction device. A pressure regulator valve 90 is provided in flow line 82. Regulator 90 may be preset or adjustable, but in any event is operable to provide gaseous fuel vapor flow at a fixed pressure below the pressure in chamber 42. In accordance with the embodiment disclosed, the output pressure from regulator 98 is between 10–20 psi and preferably about 12 psi.

A throttle valve arrangement 94 is provided in flow line 82 between regulator valve 90 and the outlet end 96 of flow line 82 which is disposed in air induction passage 88. Throttle valve assembly 94 includes a main throttle valve 98 and an acceleration responsive valve 100. Each valve 98 and 100 has an input side receiving gaseous fuel at the pressure delivered from regulator valve 90, and each valve has an output side connected to outlet end 96 of flow line 82. Main throttle valve 98 is closed when the engine is shut down and, in a manner well known in the automotive industry, is vacuum actuated upon engine turn-over to open to an idle position during engine start up. Such idle position is then maintained as a minimum open position for the throttle valve until the engine is stopped. At that time the loss of vacuum closes the main throttle valve. The main throttle valve has a variable pressure output when open from just above 0 to a maximum of from about 6–10 psi. and, preferably, about 6 psi. As it further well known, such opening and variable output is achieved through throttle linkage 101 between the vehicle accelerator pedal 102 and throttle plate 104 of air induction device 84 and between the latter and valve 98. Thus, valve 98 provides for the engine to idle and to be gradually accelerated and decelerated at normal rates through gradual depression and release of accelerator pedal 102.

In the embodiment disclosed, acceleration responsive valve 100 is a normally closed valve which, in a manner well known in the automotive industry, is spring and vacuum closed to assure against opening thereof during gradual changes or no change in position of the accelerator pedal and thus main throttle valve 98. During periods of zero or maximum vacuum, valve 100 remains closed, and the valve variably opens in response to change in vacuum level, such as by sudden depression of accelerator pedal 102 and the accompanying snap opening of throttle plate 104. Valve 100 is mechanically interconnected with main throttle valve 98 by linkage 106 which, again in a manner well known in the automotive industry, slips during normal, gradual displacement of linkage 101 by accelerator pedal 102 so that fuel flow control is by main throttle valve 98 alone. In response to sudden depression of accelerator pedal 102, linkage 106 actuates valve 100 to an open position depending on the extent of accelerator displacement. Thereafter, valve 100 is gradually returned to the closed position by a dash pot arrangement under the vacuum and spring bias. The variable output of acceleration responsive valve 100 is between the maximum output of main throttle valve 98 and the full output of pressure regulator valve 90. Thus, in the disclosed embodiment this would be between 6-20 psi. and, in the preferred embodiment, 6-12 psi. The opening of valve 100 immediately increases the gaseious fuel vapor supply pressure to air intake passage 88 to the extent dictated by the accelerator pedal displacement to accelerate the engine accordingly. Preferably, fuel vapor supply line 82 is provided with a check valve 108 to prevent flashback which may occur in the air induction device from reaching fuel vapor chamber 42. Such flashback should be stopped by the throttle valve assembly, but check valve 108 provides positive protection in the event of a failure of the throttle valve assembly in this respect.

For safety purposes, it is desirable to maintain a minimum amount of liquid fuel in reservoir 20 and, at the same time, it is desirable from the standpoint of operation to control the liquid flow into the reservoir in a manner which positively and accurately maintains the desired level and minimizes turbulence and splattering of the fuel as normally occurs with flow past a float controlled needle valve in a carburetor. These advantages are achieved with float controlled needle valve assembly 26 referred to above and illustrated in detail in FIG. 2 of the drawing. With reference in particular to the latter Figure, the float controlled needle valve assembly includes a cylindrical housing 110 having an apertured end wall 112 at the upstream end thereof with respect to the direction of liquid fuel flow from fuel line 24 into reservoir 20. Wall 112 is provided with a tubular sleeve 114 which extends through an opening therefor in housing wall 12 for connection with fuel line 24 such as by means of a suitable coupling 115 as shown in FIG. 1. The aperture in end wall 112 is provided with a tapered seat 116 adapted to be engaged by a first needle valve element 118, and the downstream end of housing 110 is provided with a tapered valve seat 120 coaxial with seat 116 and adapted to be engaged by a second needle valve element 122.

Needle valve element 118 is mounted on needle valve element 122 for displacement therewith and for displacement relative thereto. More particularly, in the embodiment illustrated, the upstream side of needle valve 122 is provided with a sleeve 124 and needle valve element 118 is provided with a stem 126 received in sleeve 124, whereby displacement of needle valve 118 relative to needle valve 122 is guided by interengagement of the sleeve and stem. A coil spring 128 surrounds stem 126 and extends between valve element 118 and the upstream side of valve element 122 at the inner end of sleeve 124, thus to bias needle valve element 118 toward seat 116. Needle valve 122 is displaced toward and away from seat 120 by means of a float 130 and in response to the level of liquid fuel 22 in reservoir 20. In this respect, housing 110 is provided with a mounting arm 132, and float 130 is attached to a generally Z-shaped lever 134 pivotally connected to arm 132 as indicated by numeral 136. The end of lever 134 remote from float 130 is connected to needle valve 122 preferably by a universal connection 138 enabling the needle valve to self-align and properly engage seat 120. It will be noted that the taper of the conical surface of needle valve 118 relative to the axes of the needle valves is less than the taper of the conical surface of needle valve 122. Preferably, the taper of valve element 118 is about one-half that of valve 122. In the embodiment shown, the taper of valve element 118 is 30° and that of valve element 122 is 60°. It will also be noted that the diameter of housing 110 is considerably larger than that of the aperture in end wall 112.

Figure 2:
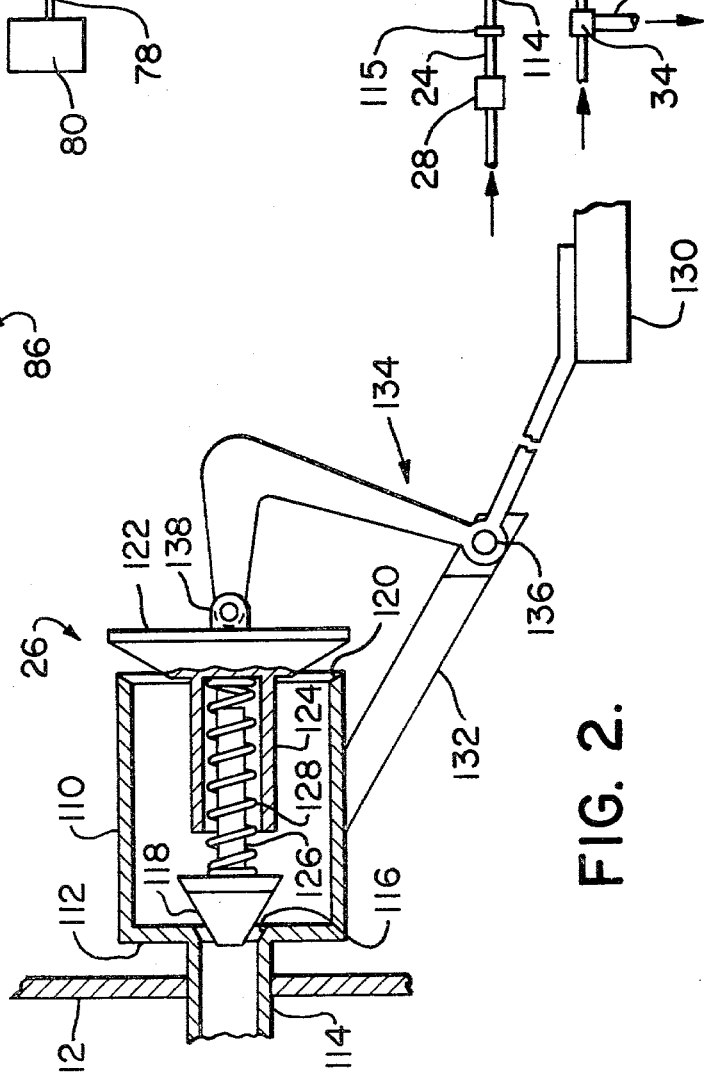

In the positions of the component parts shown in FIG. 2, reservoir 20 is empty, whereby both needle valve elements are open, and it will be noted that the spacing between seat 116 and the outer surface of needle valve 118 is about one-half the spacing between seat 120 and the outer surface of needle valve 122. These structural characteristics enable positive shut off of liquid fuel flow into reservoir 20 regardless of variations in the pressure of liquid fuel from the vehicle fuel pump and the desired regulation of flow of liquid fuel into the reservoir with minimum turbulence and splattering. In this respect, assuming reservoir 20 to be empty, liquid fuel delivered by the fuel pump will flow past needle valve 118, and the splattering and turbulent flow at this time will take place in housing 110 and will be substantially dissipated by the time the liquid fuel reaches the downstream end of housing 110 and flows past needle valve 122 and into reservoir 20. As the liquid level rises in reservoir, 20 float 30 displaces both needle valves toward their seats, and the spacing referred to above causes valve 118 to first engage seat 116 and close housing 110 against flow thereinto from fuel line 24. Fuel in housing 110 continues to flow past valve 122 into the reservoir, and the taper of the outer surface of needle valve 122 directs the fuel more laterally than axially relative to the reservoir during seating of the needle valve, thus to minimize splattering and turbulence in the reservoir.

The fuel pump of an automotive vehicle generally pumps liquid fuel at a pressure of about 4-7 psi., and it is to be noted that the force of spring 128 is sufficient to close valve 118 against this pressure when valve 118 is displaced to engage seat 116 by float displacement of valve 122. In the event of an over pressure from the fuel pump, needle valve 118 will open, but fuel flow into reservoir 20 will be positively blocked by needle valve 122 as long as the desired level exists in the reservoir. When the liquid level in reservoir 20 drops, float 130 descends to first open needle valve 122, and the large area of the opening defined by seat 120 together with the steep taper of needle valve 122 in effect provides for the liquid fuel within housing 110 to flow with minimum turbulence and splattering into the reservoir. If the fuel in housing 110 is insufficient to replenish chamber 20, the float will drop sufficiently for valve 118 to open, whereupon fuel from line 24 enters housing 110 and flows therethrough into reservoir 20. As mentioned above, splattering and turbulence of such flow takes place primarily in chamber 110 and is substantially dissipated when the liquid fuel reaches the downstream of the housing. An additional structural characteristic which is preferred in connection with regulating the flow of liquid fuel into reservoir 20 is the provision for float 130 to be of a suitable foam plastic material and to have a surface area with respect to the liquid fuel of about 60% to 70% of the cross-sectional area of side wall 12 of housing 10. The light weight foam material together with the surface area thereof greatly improves the response characteristics of the float and thus the opening and closing movements of the needle valve assembly.

Further in connection with the preferred embodiment described hereinabove, housing 10 and the fuel vapor chambers and liquid fuel reservoir therein all have an over pressure capability to further promote safety in connection with the apparatus. In this respect, for example, liquid fuel reservoir 20, low pressure chamber 40 and high pressure chamber 42 would each be capable of withstanding at least three times the design pressure, and housing 10 would be constructed to withstand three to four times the maximum design pressure of the high pressure chamber. With further regard to safety, the oversized float and control of liquid fuel flow into the reservoir advantageously enables operation of the apparatus with only about four to eight fluid ounces of liquid fuel in the reservoir, thus minimizing fire and explosion hazards in the event of an accident with the vehicle. Still further, all flow lines into housing 10 and line connections to the pressure chambers are made rigid, such as be welding, to prevent sparks and static discharge, and all lines external of housing 10 can be flexible lines suitably coupled with the housing lines to facilitate assembly therewith and the mounting and removing of the apparatus from a vehicle.

In operation of the preferred embodiment, assuming first that the internal combustion engine with which the apparatus is associated is running, liquid fuel 22 in reservoir 20 is heated by the flow of heat transfer medium through line 30 to provide maximum gaseous fuel vapor in the space above the liquid fuel. Compression pump 60 operates to draw gaseous fuel vapor from the vapor space in reservoir 20 through line 58 and into chamber 40 at a pressure of about 12-15 psi., and compression pump 70 pumps vapor from chamber 40 into chamber 42 at a pressure from about 70-80 psi. Pressure regulator valve 90 is preset or adjusted to deliver gaseous fuel vapor from high pressure chamber 42 to throttle valve assembly 94 at 12 psi., which pressure is delivered to main throttle valve 98 and to acceleration responsive valve 100. Assuming the engine to be operating to drive the vehicle at a given speed, the corresponding depression of accelerator pedal 102 provides for main valve 98 to deliver gaseous fuel vapor to air induction passage 88 at a pressure between just above 0 and 6 psi., and throttle plate 104 in cooperation with the fuel supply provides the appropriate fuel-air ratio to operate the engine. Assuming next that acceleration of the vehicle is desired, a sudden depression of accelerator pedal 102 further opens main valve 98 and, additionally, opens acceleration responsive valve 100 for the latter to deliver an additional charge of fuel into the air induction passage. The latter charge would be between 6 and 12 psi., depending on the extent of accelerator depression. Thereafter, the engine vacuum and the biasing spring cooperate with the dashpot device in valve 100 to gradually close the latter, whereby the engine resumes operation under the control of main throttle valve 98.

When the engine is stopped, the vacuum is of course lost, whereby main throttle valve 98 closes to prevent flow of fuel vapor from chamber 42 to air induction passage 88. Simultaneously, compression pumps 60 and 70 are rendered inoperable, thus preventing further pumping of vapor from reservoir 20 to chamber 40 and from chamber 40 to chamber 42. When the pumps stop, check valve 74 closes to prevent backflow from chamber 42 to chamber 40, and check valve 66 closes to prevent backflow from chamber 40 to reservoir 20. Thus, gaseous fuel vapor is maintained in chamber 42 at the 70 to 80 psi. pressure thereof and in chamber 40 at the 12 to 15 psi. pressure thereof. Further, in response to shut down of the engine, liquid fuel delivery to reservoir 20 ceases as does the heating of liquid fuel by flow through line 30, although the latter line will for a period of time continue to heat liquid fuel in the reservoir. It will be appreciated that reservoir 20 also provides storage for vapor under pressure. Advantageously, both from the standpoint of safety and economy, no vapor escapes to atmosphere upon shut down of the engine.

When it is desired to restart the engine, gaseous fuel vapor is available in chamber 42 at least substantially at the design pressure of 70 to 80 psi., and this provides a more than adequate supply of vapor to start the engine and operate the engine for a sufficient amount of time for the temperature of the heat transfer fluid flowing through line 30 to rise to the temperature at which liquid generation in receptacle 20 is at a maximum. Further with respect to engine start up, it will be appreciated that turn over of the engine together with accelerator depression opens the main throttle valve to the idle position thereof, whereby fuel vapor from chamber 42 is delivered to main throttle valve 98 at 12 psi. and from the throttle valve to air induction passage 88 at from above 0 to 6 psi. Still further, it will be appreciated that vacuum operated compression pumps 60 and 70 immediately begin to pump vapor from reservoir 20 to low pressure chamber 40 and from the latter to high pressure chamber 42, thus increasing the fuel vapor available for start up. It is believed that sufficient fuel vapor for start up and operation of the engine for the time necessary to achieve maximum generation of gaseous fuel vapor in reservoir 20 would be provided by a minimum pressure in high pressure chamber 42 of about 20 psi. Therefore, even if the pressure in chamber 42 is reduced, such as might be expected in extreme cold weather, sufficient gas vapor pressure is available to achieve engine start up and operation.

While considerable emphasis has been placed herein on the specific structure and structural interrelationship of the component parts of the apparatus described, and on specific operating pressures and capacities, it will be appreciated that these are preferred characteristics and that other structural arrangements as well as modifications of the arrangement herein disclosed and described can be made, and other operating parameters employed, without departing from the principles of the present invention. Accordingly, it is to be distinctly understood that the foregoing descriptive matter is to be interpreted merely as illustrative of the present invention and not as a limitation.

Having thus described the invention, it is claimed:

1. Liquid fuel vaporizing apparatus for an internal combustion engine having an air induction passage comprising, housing means having wall means providing a hermetically sealed enclosure, first and second hermetically sealed fuel vapor chambers in said enclosure, means providing a source of gaseous fuel vapor from a liquid fuel, first flow line means including first pump means in said enclosure for pumping fuel vapor from said source to said first chamber at a first pressure, second flow line means in said enclosure including second pump means for pumping fuel vapor from said first chamber to said second chamber at a second pressure higher than said first pressure, first check valve means in said first flow line means to prevent flow of vapor from said first chamber to said source, second check valve means in said second flow line means to prevent flow of vapor from said second chamber to said first chamber, third flow line means for connecting said second chamber with said air induction passage, and flow control means in said third flow line means and including flow control valve means for preventing unintended flow of vapor from said second chamber to said air induction passage.

2. Fuel vaporizing apparatus according to claim 1, wherein said first and second pump means are vacuum operated pumps.

3. Fuel vaporizing apparatus according to claim 1, wherein said flow control means in said third flow line means includes a pressure regulator having a pressure output which is substantially less than said second pressure.

4. Fuel vaporizing apparatus according to claim 3, wherein said flow control valve means includes throttle valve means between said pressure regulator and said air induction passage.

5. Fuel vaporizing apparatus according to claim 1, wherein said enclosure has opposite ends and said wall means of said housing means includes means providing a liquid fuel receiving reservoir at one of said ends of said enclosure, means for connecting said reservoir to a source of liquid fuel, and means controlling the level of liquid fuel in said reservoir to provide a vapor space therein defining said source of gaseous fuel vapor.

6. Fuel vaporizing apparatus according to claim 5, and means extending through said reservoir for heating liquid fuel therein.

7. Fuel vaporizing apparatus according to claim 5, wherein said means for connecting said reservoir to a source of liquid includes a first inlet passage opening into said reservoir and said means controlling the level of liquid fuel in said reservoir is float controlled needle valve means including first and second needle valve elements and corresponding first and second seats serially arranged in said fuel inlet passage.

8. Fuel vaporizing apparatus according to claim 7, wherein said first and second seats are axially spaced apart in said fuel inlet passage to provide a liquid fuel chamber therebetween opening into said reservoir, said first seat being at the upstream end of said liquid fuel chamber, float means in said reservoir operable to close said second needle valve element against said second seat, and said first needle valve element being supported by said second needle valve element in said fuel chamber for movement therewith and for movement relative thereto into and out of engagement with said first seat.

9. Fuel vaporizing apparatus according to claim 8, wherein said first needle valve element is mounted on said second needle valve element for axially slidable displacement relative thereto, and spring means biasing said first needle valve element toward said first seat.

10. Fuel vaporizing apparatus according to claim 9, wherein said first seat has a diameter less than said second seat.

11. Fuel vaporizing apparatus according to claim 10, wherein said first and second needle valve elements have tapered surfaces for engaging the corresponding seat, the taper of the surface of said first valve element relative to the axis of said valve elements being less than that of the tapered surface of said second valve element.

12. Fuel vaporizing apparatus according to claim 5, wherein said first and second pump means are vacuum operated pumps.

13. Fuel vaporizing apparatus according to claim 12, wherein said flow control means in said third flow line means includes a pressure regulator having a pressure output which is substantially less than said second pressure.

14. Fuel vaporizing apparatus according to claim 13, wherein said flow control valve means includes throttle valve means between said pressure regulator and said air induction passage.

15. Fuel vaporizing apparatus according to claim 14, wherein said throttle valve means includes first and second throttle valves between said pressure regulator and said air induction passageway, said first throttle valve having a variable output pressure from a predetermined minimum to a predetermined maximum less than said output pressure of said pressure regulator, said second throttle valve being normally closed and acceleration responsive to open, and said second throttle valve having a variable output pressure from said predetermined maximum to said output pressure of said pressure regulator.

* * * * *